April 8, 1952 M. P. WINTHER 2,591,989
CENTRIFUGAL ELECTRIC CLUTCH
Filed Nov. 17, 1949 4 Sheets-Sheet 2

Martin P. Winther,
Inventor.
Haynes and Koenig
Attorneys.

April 8, 1952 M. P. WINTHER 2,591,989
CENTRIFUGAL ELECTRIC CLUTCH
Filed Nov. 17, 1949 4 Sheets-Sheet 3

Martin P. Winther,
Inventor.
Haynes and Koenig,
Attorneys.

April 8, 1952 M. P. WINTHER 2,591,989
CENTRIFUGAL ELECTRIC CLUTCH
Filed Nov. 17, 1949 4 Sheets-Sheet 4

Martin P. Winther
Inventor.
Haynes and Koenig
Attorneys.

Patented Apr. 8, 1952

2,591,989

UNITED STATES PATENT OFFICE 2,591,989

CENTRIFUGAL-ELECTRIC CLUTCH

Martin P. Winther, Gates Mills, Ohio, assignor to Martin P. Winther, as trustee

Application November 17, 1949, Serial No. 127,898

14 Claims. (Cl. 192—84)

This invention relates to centrifugal-electric clutches, and with regard to certain more specific features, to centrifugally modulated clutches of this class primarily, but not exclusively, for automotive applications.

In its broadest aspect an object of the invention is to provide a clutch which is electrically prepared for closure and which is then closed with a modulated action in response to speed of rotation. In an automotive application this allows for preliminary preparation for closure and subsequent actual closure merely by opening the throttle of the prime mover (engine) which drives the clutch. The clutch may subsequently be opened at any prime mover speed.

Some automatic automotive transmissions are designed to employ two rotary power input members which are supplied alternatively with power from the engine through selectively operable electrically controlled friction clutches. In this connection additional objects of the present invention are the provision of means for alternatively preparing two such clutches for closure from a single exciter coil merely by exciting or deexciting it; the provision of means for modulating the closure of a given prepared clutch in response to centrifugal action as determined by prime mover speed; the provision of means for transferring power transmission from one clutch directly to the other without modulation at a speed above a predetermined value; and the provision of a clutch of the class described which under emergency conditions of current failure of the exciter coil will be in condition for connecting the prime mover with one of said rotary input members to the transmission, so that an automotive vehicle on which the device is located may be brought to a repair point under its own power. Other objects will be in part apparent and in part pointed out hereinafter.

Briefly, the invention in its over-all aspects consists in a compound clutch having a first clutch component and a second clutch component wherein either the first or second component is electromagnetically prepared for closure when the engine is operating at idling speed. The preparation, which is selective, may be simply performed either by exciting or deexciting a magnetic field coil. After either clutch component is prepared for closure, it may ultimately be closed by centrifugal action by operating the prime mover above idling speed. This provides a desirable modulation of closure of the prepared clutch in response to engine acceleration. Moreover, selective alternate closure of the clutch components may be effected above idling speeds without modulation by said excitation or deexcitation of the field coil.

In a more specific sense, the invention comprises a toroidal flux field coil surrounded by magnetizable rings which are axially biased apart by springs but adapted to be attracted against the bias by the magnetic field from said coil only when excited. One of the magnetizable rings when biased (coil unexcited) moves to a position such that it is capable of acting as a clutch-driving element of what will be referred to as a second clutch. On the other hand, when this magnetizable ring is attracted, it influences a second ring to come into position to become capable of acting as a driving clutch element for a first clutch. Thus the potentialities of either clutch to become closed depend upon excitation or nonexcitation of the coil. A third ring is provided for the first clutch and a fourth ring for the second clutch. These are under control of a centrifugal mechanism which in response to increase in speed forces the third and fourth rings toward one another. Stops are arranged for these third and fourth rings such that when the coil is energized, engagement of the fourth ring with its stops provides a fulcrum for drawing the third ring (short of its stops) to squeeze a driven clutch disc of the first clutch. When the coil is deenergized, the said second ring ceases to provide any reaction and the first clutch opens, whereupon the third ring engages its stops and thereafter provides a reaction whereby the fourth ring under centrifugal action may be forced toward (but short of) its stops. At this time the first magnetizable ring, being released against its stops, is in the position to provide reaction so that the centrifugal mechanism can squeeze a driven element of the second clutch against the first ring to close said second clutch.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a longitudinal section of a compound clutch embodying the invention, prepared for closing its first clutch component, being taken on line 1—1 of Fig. 3;

Similar reference characters indicate corresponding parts throughout the several views of the drawings.

Figure 1:
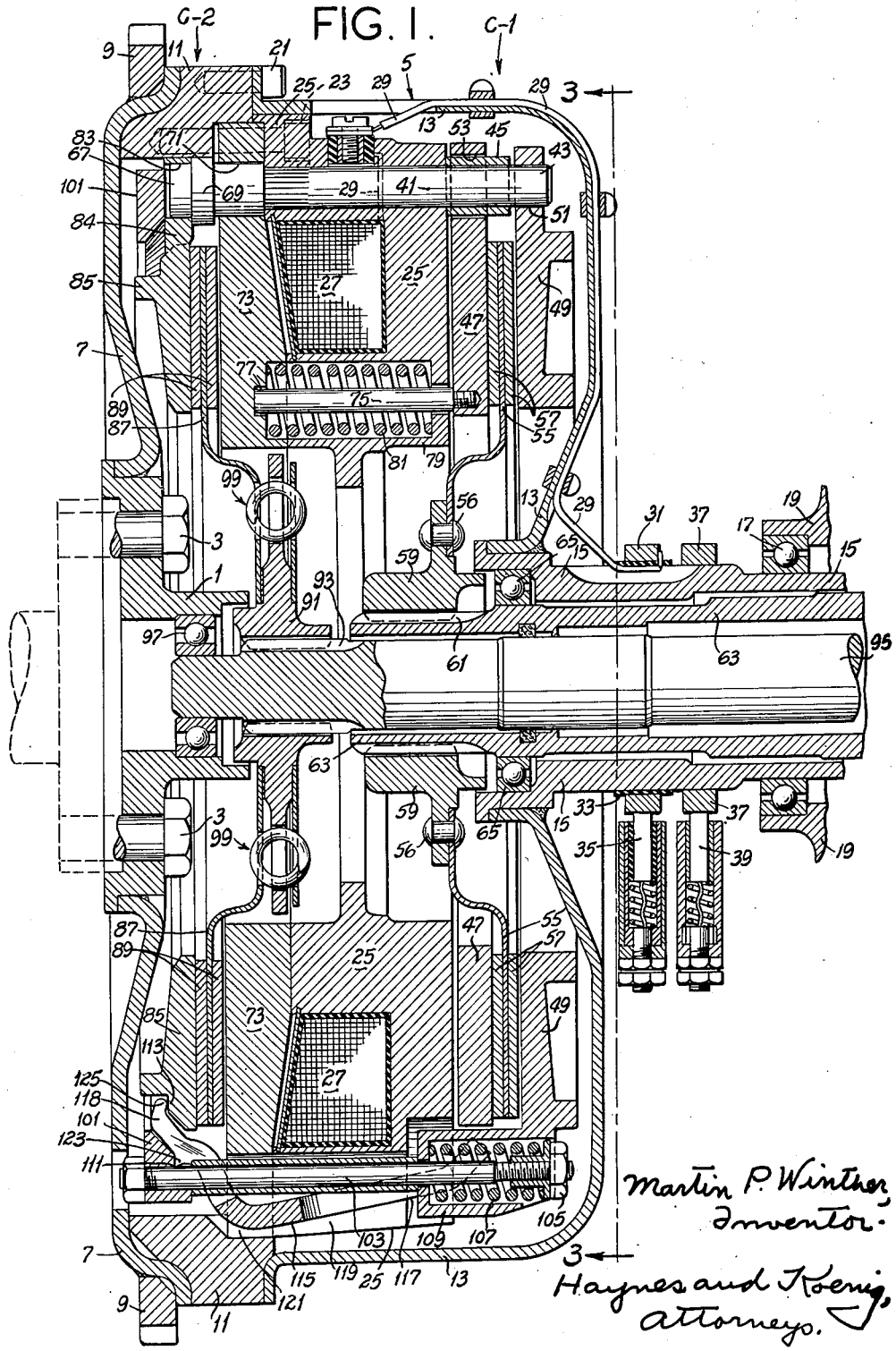

Referring now more particularly to Fig. 1, there is shown at numeral 1 a driving hub which is adapted to be fastened to the driving flange of a prime mover such as an automotive engine, fasteners 3 being indicated for the purpose. A rotary clutch housing or driver is indicated in general at numeral 5, a front plate 7 of which is attached to the hub 1. This plate 7 carries the usual prime mover starter gear 9 and an attached ring 11. Bolted to the ring 11 is a rear cover 13 which carries a sleeve 15 supported in suitable bearings 17 within a part of the supporting frame 19. Bolts for fastening the cover 13 are shown at 21. Only a small part of the frame 19 is shown, since it may constitute any suitable part, such as the front end of an automatic or other transmission to which the clutch is attached. The members 7, 11, 13 and 15 rotate as a unit, being driven from the prime mover.

Attached by means of bolts 23 to and rotary with ring 11 is an axially fixed magnetizable ring 25. This ring is recessed to accept an annular field coil 27. The coil 27 is excited through a circuit including wires 29 which lead to a slip ring 31 carried on the sleeve 15 but insulated therefrom by a band of insulation 33. The circuit is closed through a brush 35. The coil 27 is grounded through the rotating parts above-mentioned, including the sleeve 15, the grounding connections being completed through an additional slip ring 37 in connection with which a brush 39 is used. Further circuit details for exciting coil 27 are unnecessary, such being well known in this art.

The magnetizable ring 25 carries permanently inserted studs 41 which extend out on both sides of it. On the right side, the extensions are indicated by numerals 43. The extensions 43 include permanently attached shoulder-forming sleeves 45. The shoulders 45 are located in openings 53 of a first backing ring 47 which may slide axially on said shoulders. The extensions 43 beyond the shoulders 45 slidably support a first pressure ring 49, passing through suitable openings 51 for the purpose. Sandwiched between the rings 47 and 49 is a first clutch disc 55, provided with friction facing 57. This clutch disc has a central hub 59 slidingly splined at 61 to a quill or first driven member 63 which forms one of the power input members for the transmission which the clutch serves. Thus disc 55 has a floating location between rings 47 and 49. A bearing 65 is interposed between quill 63 and sleeve 15. By means of the spline 61 the hub 59 is free to float axially on the quill 63 but rotates therewith, forming a driving connection.

Figure 2:
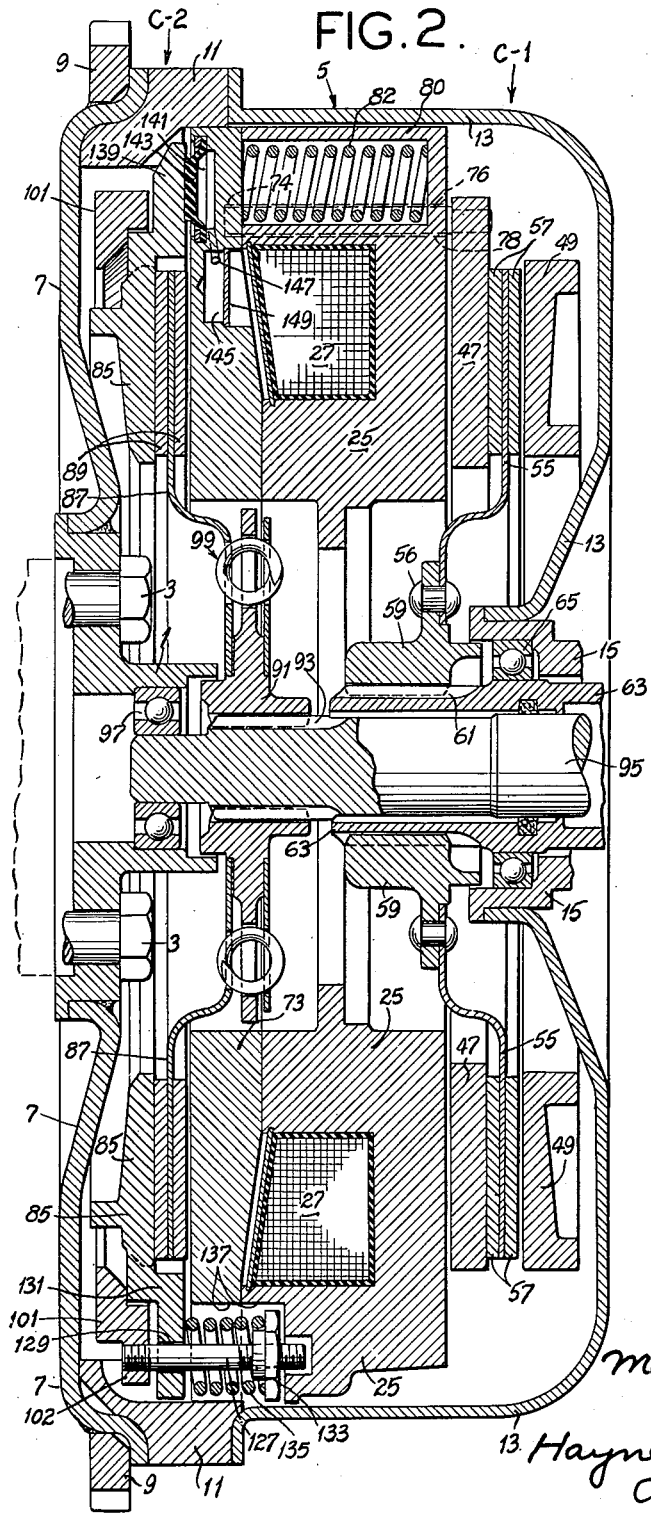
Fig. 2 is a view similar to Fig. 1 but taken on line 2—2 of Fig. 3.

The pins 41 also have extensions 67 from the left side of the ring 25, upon which are shoulders 69. Within the shoulders 69 and carried upon the inner portions of extensions 67 (by means of openings 71) is a magnetizable ring 73. The shoulders 69 are so positioned that the ring 73 may move axially. Inner spacing pillars 75 extend from the plate 47 (above described) into abutting engagements with seats 77 in the ring 73. The pillars 75 pass through pockets 79 in the ring 25. In the pockets are also compression rings 81. For balanced guiding action, additional outer pillars 76 are employed (Fig. 2). They also extend from the ring 47 loosely through openings 78 in the ring 25 and into outer seats 74 in the ring 73. Thus the rings 47 and 73 may approach one another only a predetermined amount. In order to complement the springs 81 (for balanced action), there are provided separating compression springs 82 in pockets 80 of the ring 25 which also react against the ring 73 (see Fig. 2). These springs 82, in addition to springs 81, tend to bias apart the rings 25 and 73.

The outer ends of the left-hand extensions 67 pass into openings 83 in lugs 84 of a pressure ring 85. Between this ring 85 and magnetizable ring 73 is a second clutch disc 87, provided with friction facing 89. The disc 87 has a central hub 91, slidingly splined as shown at 93 to a shaft 95, the latter constituting the second power input member to the transmission served by the apparatus. Thus disc 87 has a floating location between rings 85 and 73. The splines 93 permit axial play but effect a rotary driving connection.

The shaft 95 is carried within a pilot bearing 97 supported in the main hub 1. The connection between the clutch disc 87 and the hub 91 is through a spring vibration damper arrangement shown at 99, further description of which will not be necessary, since such an arrangement is a refinement and common between clutch discs and their hubs. A similar arrangement is not required for the clutch disc 55 (rivets 56 being used) because the characteristics of the transmission served by this apparatus require torsional vibration damping only in connection with the disc 87.

Figure 5:
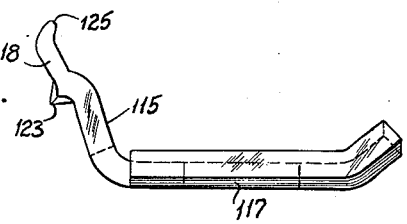
Fig. 5 is a side elevation of a detached centrifugally operating weight lever.
Figure 6:
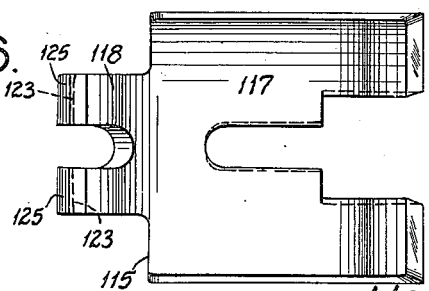
Fig. 6 is a plan view of Fig. 5, being an inside view of the lever when in position in the clutch.

To the left of the extensions 67 is a reaction ring 101 which is connected with ring 49 through tension rods 103 having heads 105. Beneath the heads 105 are compression springs 107 which are carried in and seat within pockets 109 formed with the ring 49. The tendency of the springs 107 is to bias together the rings 49 and 101. Within the ring 101 is a heel seat 111 and on the outside of the ring 85 is a toe seat 113. At 115 are shown centrifugal weight levers (see Figs. 5 and 6). Each weight lever 115 is constituted by a central weight-forming portion 117, the contour of which is such as to clear the rods 103, pockets 109 and other parts. The rings 25 and 73 are suitably notched as shown at 119 and 121 to accommodate this central mass 117. Each lever has a foot 118 incorporating a heel 123 bearing within the seat 111 of ring 101 and a toe 125 bearing upon the seat 113 of the ring 85. In view of the tendency of springs 107 to bias together the rings 49 and 101 and the action of the heels 123 and toes 125 on rings 101 and 85, respectively, the lever weights 115 are normally biased to a counterclockwise position (referring to Fig. 1). The reaction points required for this action will be discussed below. Under centrifugal force induced by rotation, the lever weights 115 tend to move in a clockwise direction.

As shown in Fig. 2, the rings 85 and 101 are resiliently biased together by studs 127 attached to lugs 102 on ring 101 and passing through openings 129 in lugs 131 extending from the ring 85. These studs 127 carry heads 133 underneath which are springs 135 which react against the lugs 131 of ring 85. Suitable pockets 137 are arranged in rings 73 and 25 to accommodate the studs and springs where peripherally located.

Figure 3:
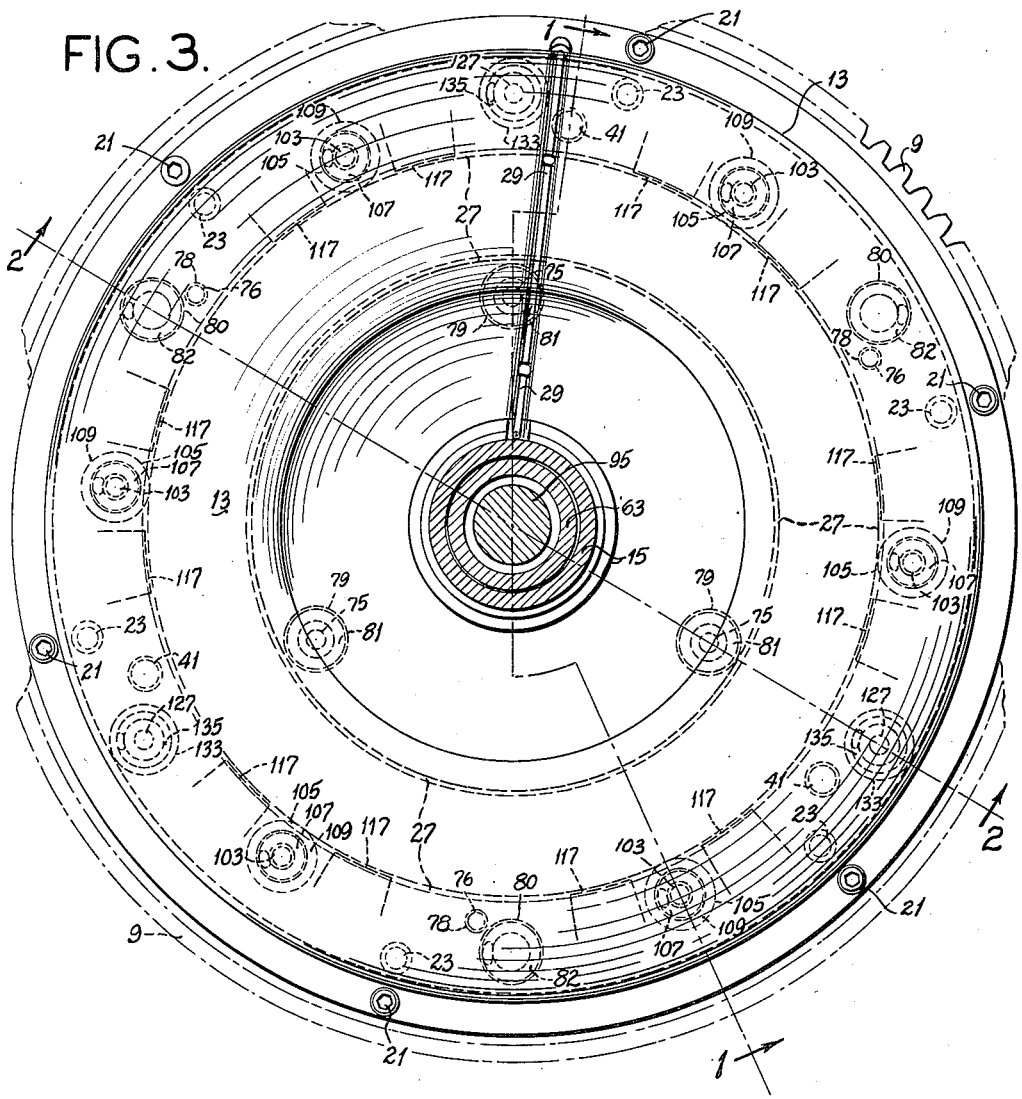
Fig. 3 is a cross-sectional view of the right end of the device, taken on line 3—3 of Fig. 1 but on a reduced scale.

The sections shown in Figs. 1 and 2 have been selected to show one each of various identical multiple elements. As appears in Fig. 3 there are in fact spaced at equal intervals three studs 41; three pockets 79, studs 75 and springs 81; three studs 76, pockets 80 and springs 82; three studs 127, heads 133 and springs 135; and six pockets 109, rods 103, heads 105 and springs 107.

In order to provide desired time delay for any approach of rings 73 and 85, the latter (Fig. 2) is provided with lugs 139. There are provided oppositely at intervals around the ring 73 circular pockets 141, each covered by a resilient diaphragm 143. Each pocket 141 is connected with an inwardly located circular pocket 145 by means of a restrictive port 147. Pocket 145 is enclosed by a cover 149. A suitable fluid, such as a constant viscosity oil, fills the pockets 141. Under rotation such oil tends to spin out into pockets 141. Upon any relative approach between rings 73 and 85, the lugs 139 compress the diaphragms 143, thus forcing the fluid out of pockets 141 into pockets 145 through the restricted passages 147, thus providing a time delay for said approach. When rings 73 and 85 are permitted to separate, the fluid then in the inner pockets 145 moves by centrifugal force outward into pockets 141 via the passages 147, ready to be squeezed in again upon the next approach cycle. It will be understood that only one time-delay system involving pockets 141 and 145 is shown in Fig. 2 but that three of these are employed at equally spaced intervals around the periphery of the device, the others being out of the plane of the section of Fig. 2 and not dotted in Fig. 3.

Operation is as follows:

Assume that coil 27 is excited and the engine to be operating within idling range (say at 500 R. P. M.). This rotates the clutch housing 5, including covers 7 and 13, rings 11, 25, 47 and 49 (which form the driving members of what will be referred to as clutch C-1); and rings 73, 85 (which form the driving members of what will be referred to as clutch C-2). Under idling conditions (speeds under a predetermined amount) and the coil 27 excited, the parts are in the Fig. 1 condition (weights 115 in) wherein the spacing between rings 47 and 49 and that between rings 73 and 85 is sufficient that no frictional drive is delivered to either disc 55 of clutch C-1 or disc 87 of clutch C-2. But excitation has prepared clutch C-1 for closure since the flux field of the coil 27 has attracted the ring 73 so that rings 25 and 73 are as close together as they can be. Ring 73 opens free space for disc 87. At this time springs 81 and 82 are compressed. The seats 77 and 74 in ring 73, through pillars 75 and 76, transmit motion to the ring 47 so that it is as far to the right as possible. This pushes the outer face of lining 57 beyond stops 45. Under idling conditions, the centrifugal force is insufficient to throw the weights 115 enough clockwise substantially to compress springs 107 (through any levering action of the heels 123 and toes 125 on the seats 111 and 113, respectively). Thus ring 49 opens free space for disc 55. However, when the speed is increased above idling (above a speed predetermined by a setting of heads 105 or 133 in connection with springs 107 or 135, respectively), the lever weights 115 move outward (clockwise, Fig. 1). The result is that feet 118 are turned clockwise. Heels 123 move to the left, pushing ring 101 to the left while the toes 125 bear on the seat 113. It is to be noted that ring 85 cannot move further to the right than shown in Fig. 1, because it seats on the shoulders 69. Since ring 73 has been magnetically retracted, clutch C-2 remains open. The leftward motion of ring 101 is thus transmitted through rods 103 to springs 107, which push resiliently on ring 49, moving it to the left. Since the clutch disc 55 (including its lining) is now backed by the magnetically held ring 47 in its right-hand position, the clutch disc is squeezed by rings 47 and 49. The squeezing force increases with increase in speed, springs 107 deflecting increasingly. Upon a sufficient increment of speed increase, clutch C-1 after an initial period of slip under acceleration becomes locked shut in synchronism between its driving and driven elements. At this time the ring 49 does not reach the shoulders 45. Thus clutch C-1 is modulated shut while clutch C-2 remains open at speeds above idling.

If at said speeds above idling it is desired to open clutch C-1 and close clutch C-2, it is only necessary to deexcite coil 27. Springs 81 and 82 will then bias the ring 73 leftward into engagement with the clutch disc 87, which is backed up by the ring 85. Note that stops 69 are narrower than the thickness of disc 87 and its lining. The action for holding ring 85 is supplied by the centrifugal force of weights 115, which rock on the heels 123 and bias ring 85 to the right by means of the toes 125. The reaction for this condition is furnished through the rods 103, springs 107 and ring 49, which seats on the shoulders 45. Note that the length of stops 45 is more than the combined thicknesses of ring 47 and disc 55 with its facings. Hence clutch C-1 cannot close. Should the speed of the clutch decrease below the predetermined setting for centrifugally holding either clutch shut, both clutches will be open, regardless of whether or not the coil 27 is excited or deexcited.

Figure 4:
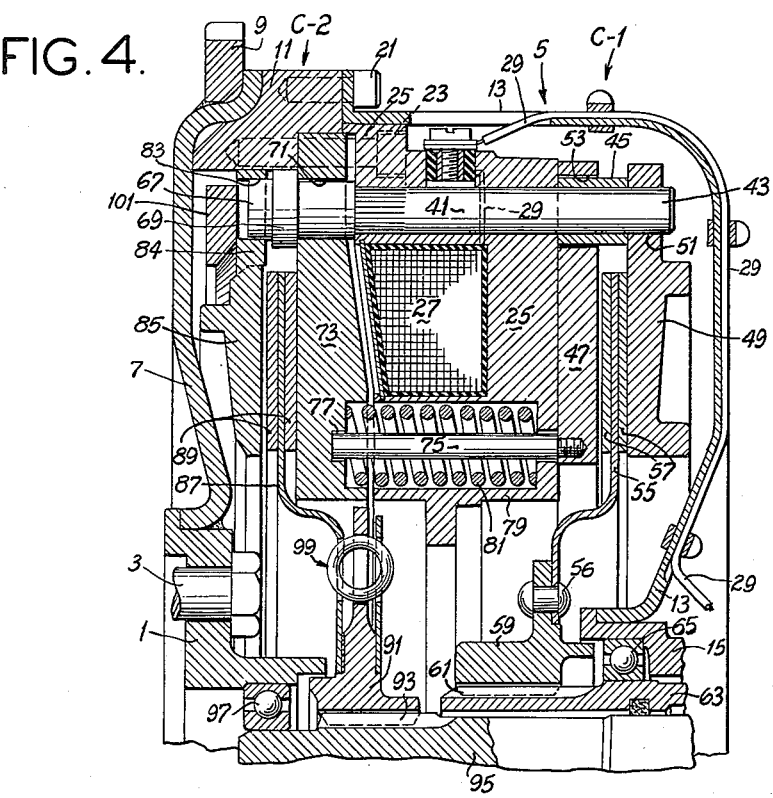
Fig. 4 is a fragmentary view similar to the upper portions of Fig. 1 but prepared for closing the second clutch component.

From the above it will be seen that any transmission served by the present clutch depends for any completely automatic electrical operation upon current being available for the coil 27. It sometimes happens that a vehicle has a dead battery, in which event it is desirable to be able to drive it under its own power to a repair point. This is possible with the present clutch because when coil 27 is deexcited (dead battery), clutch C-2, although open under idling conditions, is in effect prepared for subsequent closure when the engine is accelerated above idling speed (see Fig. 4). This is because the ring 73 is then biased against the stops 69 by springs 81 and 82. At idling speed the ring 85 will float to the left (weights 115 inward). However, when rotation is increased above idling speed, the weights 115 move outward, turning the feet 118 clockwise to force ring 85 to close against the disc 87 which is backed by spring pressed ring 73 now acting as a backstop. Reaction is provided through rods 103 and springs 107 from the ring 49, which will then be on the shoulder stops 45, clutch C-1 remaining open.

Among the advantages, in addition to those already made clear from the above, is the fact that all clutch-closing forces are applied through springs, which with the modulating centrifugal closing action and the time-delay action furnished by the hydraulic elements 141, 143 and 145, assures smoothly modulated clutch closures with smooth accelerations.

Terms used in the following claims have for the most part been definitively described above. The term centrifugal mechanism will be understood to refer to the lever weights 115 with the cooperating ring 101, rods 103, heads 105 and springs 107, or their equivalents.

In addition, for brevity, ring 47 is referred to as a first backing ring, ring 73 as a second backing ring, ring 49 as a first pressure ring and ring 85 as a second pressure ring. Stops 45 are referred to as a first set of such members, operative in cooperation with the first rings 47 and 49 in the first clutch C-1. Stops 69 are referred to as a second set of such stops, operative in cooperation with the second rings 73 and 85 in the second clutch C-2. It will be noted that each of the backing rings 47 and 73 in its position farthest away from the coil 27 holds its respective driven disc 55 or 87 in a position where the respective pressure ring 49 or 85 can press the respective floating disc 55 or 87, since these pressure rings cannot then reach their stops. Otherwise they can, but under the latter conditions the backing rings cease to provide any reaction for clutch closing. In the case of the backing ring 47, electromagnetic means (excitation of coil 27) results in the backing ring 47 assuming its position preparatory to centrifugal clutch closing by ring 49. In the case of the backing ring 73, spring pressure means (springs 81 and 82 in the absence of excitation of the coil 27) cause the backing ring 73 to assume its position preparatory to centrifugal clutch closing by ring 85. Heads 105 constitute means for adjusting the speed at which the centrifugal mechanism can be adjusted to respond to a desired speed.

The expansible chambers 141, with chambers 145 and throttles 147, constitute a time-delay mechanism operative in association with the centrifugal mechanism for delaying clutch closure. It will be observed that this time-delay mechanism is effective in connection with both clutches C-1 and C-2 because it is within the train of force reactions during either clutch closure. The train of force reactions is as follows. After C-1 is prepared for engagement (at idling speeds and by exciting coil 27) the movement of weights 115 (with corresponding movement of shoes 118) in response to the increasing speed of the prime mover causes rings 101 and 85 to be moved away from each other relatively, and against the bias of springs 135. Ring 85 is thereby forced to the right toward stops 69 and ring 73, and its points of reaction are initially against the diaphragms 143. As the movement of ring 85 is cushioned by diaphragms 143, ring 101 will be moved to the left away from ring 85 and draw with it ring 49 against the biasing action of springs 107. In this way there is a time delay effected in the closure of C-1. As to delay in closing C-2 from a start, coil 27 being deenergized and ring 73 being to the left, the engagement of C-2 is delayed by the squeezing of diaphragms 143 against lugs 139 of ring 85. It will be understood that after a start has been accomplished by closure of clutch C-1 with time delay (ring 85 seating on the stops 69 and weights 117 out) there will also be time delay in closing clutch C-2 when coil 27 is deenergized under running conditions, for this releases ring 73 for movement to the left. In this event the expanded diaphragms 143 carried on ring 73 will engage lugs 139 of ring 85, thus introducing the delay. This delay mechanism is effective regardless of the adjustments of heads 105 for clutch closure speed response.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A clutch comprising a driver and a driven member, a magnetic field member rotary with the driver, an axially movable backing ring also rotary with the driver, means for moving the backing ring from a first to a second position in response to excitation of the field member, an axially movable pressure ring rotary with the driver, a driven disc rotary with the driven member and having a floating location between said rings, a centrifugal mechanism responsive to rotation of the driver adapted to move the pressure ring toward the backing ring in response to a predetermined speed, and stops so arranged that when the field member is excited the pressure ring in response to said centrifugal mechanism can press the driven disc against the backing ring in its second position, and when the field member is deexcited the pressure ring will engage the stops and the backing ring may move into its first position wherein the driven disc is released.

2. A clutch made in accordance with claim 1, wherein an adjusting means is provided in connection with the centrifugal mechanism for predetermining said speed.

3. A clutch made in accordance with claim 1, wherein a time-delay mechanism is operative in connection with the centrifugal mechanism adapted to delay clutch closure by delaying movement of the pressure ring as it moves toward the backing ring.

4. A clutch made in accordance with claim 1, wherein an adjusting means is provided in connection with the centrifugal mechanism for predetermining said speed, and wherein a time-delay mechanism is operative in connection with the centrifugal mechanism adapted to delay clutch closure regardless of the adjustment of said adjusting means.

5. A clutch comprising a driver and a driven member, a magnetic field member rotary with the driver, an axially movable backing ring also rotary with the driver, means for moving the backing ring from a first to a second position in response to deexcitation of the field member, an axially movable pressure ring rotary with the driver, a driven disc rotary with the driven member and having a floating location between said rings, a centrifugal mechanism responsive to rotation of the driver adapted to move the pressure ring toward the backing ring in response to a predetermined speed, and stops so arranged that when the field member is deexcited the pressure ring in response to said centrifugal mechanism can press the driven disc against the backing ring in its second position, and when the field member is excited the pressure ring will engage the stops and the backing ring will move into its first position wherein the driven disc is released.

6. A clutch made in accordance with claim 5, wherein an adjusting means is provided in connection with the centrifugal mechanism for predetermining said speed.

7. A clutch made in accordance with claim 5, wherein a time-delay mechanism is operative in connection with the centrifugal mechanism adapted to delay clutch closure by delaying movement of the pressure ring as it moves toward the backing ring.

8. A clutch made in accordance with calim 5, wherein an adjusting means is provided in connection with the centrifugal mechanism for predetermining said speed, and wherein a time-delay mechanism is operative in connection with the centrifugal mechanism adapted to delay clutch closure regardless of the adjustment of said adjusting means.

9. A clutch comprising a driver, first and second driven members, a magnetic field member rotary with the driver, first and second axially movable backing rings both rotary with the driver, means for moving the first backing ring from a first to a second position when the field coil is excited, means for moving the second backing ring from a first to a second position when the field coil is deexcited, first and second axially movable pressure rings rotary with the driver, a first driven disc rotary with the first driven member and having a floating location between said first backing and pressure rings, a second driven disc rotary with the second driven member and having a floating location between said second backing and pressure rings; a centrifugal mechanism responsive to rotation of the driver adapted to move the first and second pressure rings toward the first and second backing rings respectively in response to a predetermined speed; first stop means so arranged with respect to the first pressure and backing rings that when the field member is excited the first pressure ring in response to said centrifugal mechanism will clamp the first driven disc against the first backing ring in its second position, and when the field member is deexcited the first pressure ring will engage the first stop means and the first backing ring will move into its first position wherein the first driven disc is released; and second stop means so arranged with respect to the second pressure and backing rings that when the field member is deexcited the second pressure ring in response to said centrifugal mechanism will clamp the second driven disc against the second backing ring in its second position, and when the field member is excited the second backing ring will disengage the second stop means and move into its first position wherein the second driven disc is released.

10. A clutch made according to claim 9, wherein a time-delay mechanism is provided in association with the centrifugal mechanism adapted to delay the movement of either pressure ring as it moves toward its respective backing ring.

11. A clutch made in accordance with claim 9, wherein an adjusting means is provided in connection with the centrifugal mechanism for predetermining said speed.

12. A clutch made in accordance with claim 9, wherein an adjusting means is provided in connection with the centrifugal mechanism for predetermining said speed, and wherein a time-delay mechanism is provided in connection with the centrifugal mechanism adapted to delay clutch closure by delaying movement of either pressure ring irrespective of the adjustment of said adjusting means.

13. A clutch comprising a driving member, a driven member, a backing ring rotary with the driving member, an axially movable pressure ring rotary with the driving member, a driven disc between the backing and pressure rings and attached to the driven member, a speed-responsive centrifugal mechanism adapted to move the pressure ring toward the backing ring to engage the driven disc for clutch closure, and a time-delay mechanism for delaying action of the centrifugal mechanism, said time-delay mechanism comprising an expansible chamber on a relatively larger radius and containing a fluid, and a receiving chamber on a relatively smaller radius in restricted communication with the expansible chamber and adapted to receive fluid therefrom, both chambers being on one of the members rotary with the driving member, an expansible part of said expansible chamber being engageable by a part on the pressure ring for movement of fluid toward the receiving chamber when the pressure ring moves toward the backing ring, centrifugal force returning fluid from the receiving chamber to the expansible chamber upon recession of the pressure ring away from the backing ring.

14. A clutch comprising driving and driven members, a driven disc on the driven member and relatively axially movable rings on the driving member for clamping said driven disc and adapted to move toward and away from one another, a time-delay mechanism for delaying clamping action comprising an expansible chamber on a relatively larger radius in one of the relatively axially movable rings and containing a liquid, a receiving chamber in the last-named ring on a relatively smaller radius in restricted communication with the expansible chamber and adapted to receive liquid therefrom, an expansible part of said expansible chamber being engageable by a part on the pressure ring for movement of liquid toward the receiving chamber when the pressure rings approach one another, centrifugal force returning liquid from the receiving chamber to the expansible chamber when the pressure rings separate.

MARTIN P. WINTHER.

REFERENCES CITED

The following references are of record in the file of this patent:

UNITED STATES PATENTS

| Number | Name | Date |
| --- | --- | --- |
| 1,981,807 | Lyman | Nov. 20, 1934 |
| 2,209,774 | Kiekhaefer | July 30, 1940 |
| 2,239,568 | Newton | Apr. 22, 1941 |
| 2,280,736 | Winther | Apr. 21, 1942 |

FOREIGN PATENTS

| Number | Country | Date |
| --- | --- | --- |
| 829,954 | France | July 18, 1938 |